United States Patent [19]
Gillingham et al.

[11] Patent Number: 5,124,571
[45] Date of Patent: Jun. 23, 1992

[54] DATA PROCESSING SYSTEM HAVING FOUR PHASE CLOCKS GENERATED SEPARATELY ON EACH PROCESSOR CHIP

[75] Inventors: Ronald D. Gillingham; James F. Mikos; James D. Strom; John T. Trnka, all of Rochester, Minn.

[73] Assignee: International Business Machines Corporation, Armonk, N.Y.

[21] Appl. No.: 677,067

[22] Filed: Mar. 29, 1991

[51] Int. Cl.⁵ .................... H03K 5/13; H03K 19/00
[52] U.S. Cl. .................... 307/269; 307/480; 307/262; 307/303; 328/63
[58] Field of Search ............... 307/269, 480, 441, 303, 307/219, 513, 262; 328/63, 72, 109, 133

[56] References Cited

U.S. PATENT DOCUMENTS

| | | | |
|---|---|---|---|
| 3,337,747 | 8/1967 | Krasnick et al. | 307/262 |
| 3,745,472 | 7/1973 | Garth | 307/269 |
| 4,185,245 | 1/1980 | Fellinger et al. | 307/269 |
| 4,239,982 | 12/1980 | Smith et al. | 307/269 |
| 4,564,953 | 1/1986 | Werkimg | 307/269 |
| 4,691,124 | 9/1987 | Ledzius et al. | 307/480 |
| 4,866,397 | 9/1989 | Kimyacioglu | 307/262 |

Primary Examiner—Edward P. Westin
Assistant Examiner—Richard Roseen
Attorney, Agent, or Firm—J. Michael Anglin

[57] ABSTRACT

A digital system generates a single-phase master clock and distributes it to multiple cards and chips incorporating the functional logic of the system. A circuit in each chip divides the single clock into four spaced clock phases at the same frequency as the master clock. The individual phases are then distributed to functional logic circuits within the same chip. The circuit generates the phases by detecting the midpoints of a triangular wave produced from the single-phase master clock.

29 Claims, 7 Drawing Sheets

DATA PROCESSING SYSTEM HAVING FOUR PHASE CLOCKS GENERATED SEPARATELY ON EACH PROCESSOR CHIP

BACKGROUND OF THE INVENTION

The present invention relates to digital data-processing systems, and specifically concerns the generation and use of multiphase clock signals in a multiple-chip system.

At the heart of every digital data-processing system beats a clock which synchronizes almost every operation of the system. The processor executes instructions, parts of instructions, and parts of parts of instruction in step with the master clock. Buses regulate the flow of data from one unit to another according to the clock signals. The primal measure of a system's speed is the cycle time of its master clock.

Many events within the individual digital circuits of a data-processing system must occur in a particular sequence. For example, conventional data latches receive data, latch the data, and transfer it to an output in response to different clock signals whose proper sequence must be maintained over extremes of temperature, supply-voltage variation, and manufacturing tolerances from one chip to another. On a larger scale, storage registers must receive address and data signals in a predetermined order over these variations in operating conditions. Registers at different locations on a processor chip, and on different chips, must exchange sequential signals without overlap.

Many digital systems use a simple square-wave (single-phase) master clock signal for all circuits. One way to increase the effective speed of such a system is to use multiple clock phases, all at the same frequency. This technique allows the proper sequences to be enforced without increasing the operating speed of the functional logic circuits. However, conventional methods of generating and distributing multiphase clocks have significant disadvantages.

The simplest way to increase the speed of a digital system is to increase its raw clock frequency, thus decreasing the duration of each clock cycle. However, ensuring the proper sequence of events within the system sometimes requires that two events be separated by an entire clock cycle, so that unavoidable circuit-delay variations will not create race conditions.

One way to employ multiphase clocks in a digital system is to divide a single square-wave clock signal into multiple phases on a single master clock chip, each phase being a square wave having a predetermined relative time relationship to the others, and then distribute each phase separately to each card and chip in the system. This requires expensive and space-consuming additional clock lines and connections on backplanes and cards. Moreover, distributing these phases to a number of different functional cards and chips within a card degrades their relative timing so badly that much of the advantage of having multiple phases is lost.

Another method is to generate a single-phase master clock at a very high frequency, distribute it to each card and chip, then employ digital counter circuits on each chip to generate the separate phases. This method avoids the relative-timing problem, but it requires the distribution of extremely high frequencies from card to card and from one chip to another. Circuit structures for such frequencies are expensive and difficult to manufacture.

A further way to achieve multiple phases is known to the art. A single signal at the final frequency is distributed from the master clock to each chip, thus avoiding complex distribution circuits. Within each chip, a voltage-controlled oscillator and a phase-locked loop generate a high-frequency multiple of the incoming clock. Then counter circuits derive the multiple phases at the lower frequency. This expedient avoids high-frequency distribution, but it has the marked disadvantage of requiring a large area on each chip for these extra circuits. Moreover, such circuits frequently require off-chip filter components, which use circuit-card space and valuable pin connections for each chip.

SUMMARY OF THE INVENTION

The present invention enhances the operating speed of a clocked digital system having multiple cards and/or multiple semiconductor chips on a card. It allows a single-phase master clock signal of frequency $F_{MC}$, generated at one place in the system, to be converted to separate, sequential clock phases at the same frequency $F_{MC}$ for controlling the functional logic of individual chips. The invention does not require the generation or distribution of any signal having a cycle frequency higher than $F_{MC}$, nor does it require the distribution from one card to another—or even from one chip to another—of multiple clock phases whose time differences must be accurately preserved. These and other objects of the invention are achieved at a minimum cost, and without any requirement for semiconductor technologies not already used for implementing the digital functional logic of the system chips.

Broadly speaking, a digital system according to the invention produces a system clock at a base frequency. Multiple cards and/or chips containing functional logic receive this clock. Each chip separately produces four clock phases, independently of those produced by other chips in the system, and distributes them to the functional logic on that chip. The phases have the same frequency as the system clock, but are displaced in time. The phases are sufficiently accurate from one chip to another that the functional logics can be interconnected among multiple chips without data-timing errors. Each chip constructed according to an aspect of the invention receives the single master clock at the base frequency, and produces square waves for first and third phases directly from the master clock. A delay circuit determines the midpoint time of different levels of the master clock, and produces therefrom square waves for the second and fourth clock phases. A delay circuit constructed according to an aspect of the invention converts the master clock into a triangular waveform symmetrical about a baseline. A detector circuit senses zero-crossings of the triangle, and produces therefrom square waves having transitions representing the second and fourth phases.

BRIEF DESCRIPTION OF THE DRAWING

FIG. 2 comprising

FIG. 4, comprising

DETAILED DESCRIPTION OF A PREFERRED EMBODIMENT

Figure 1:
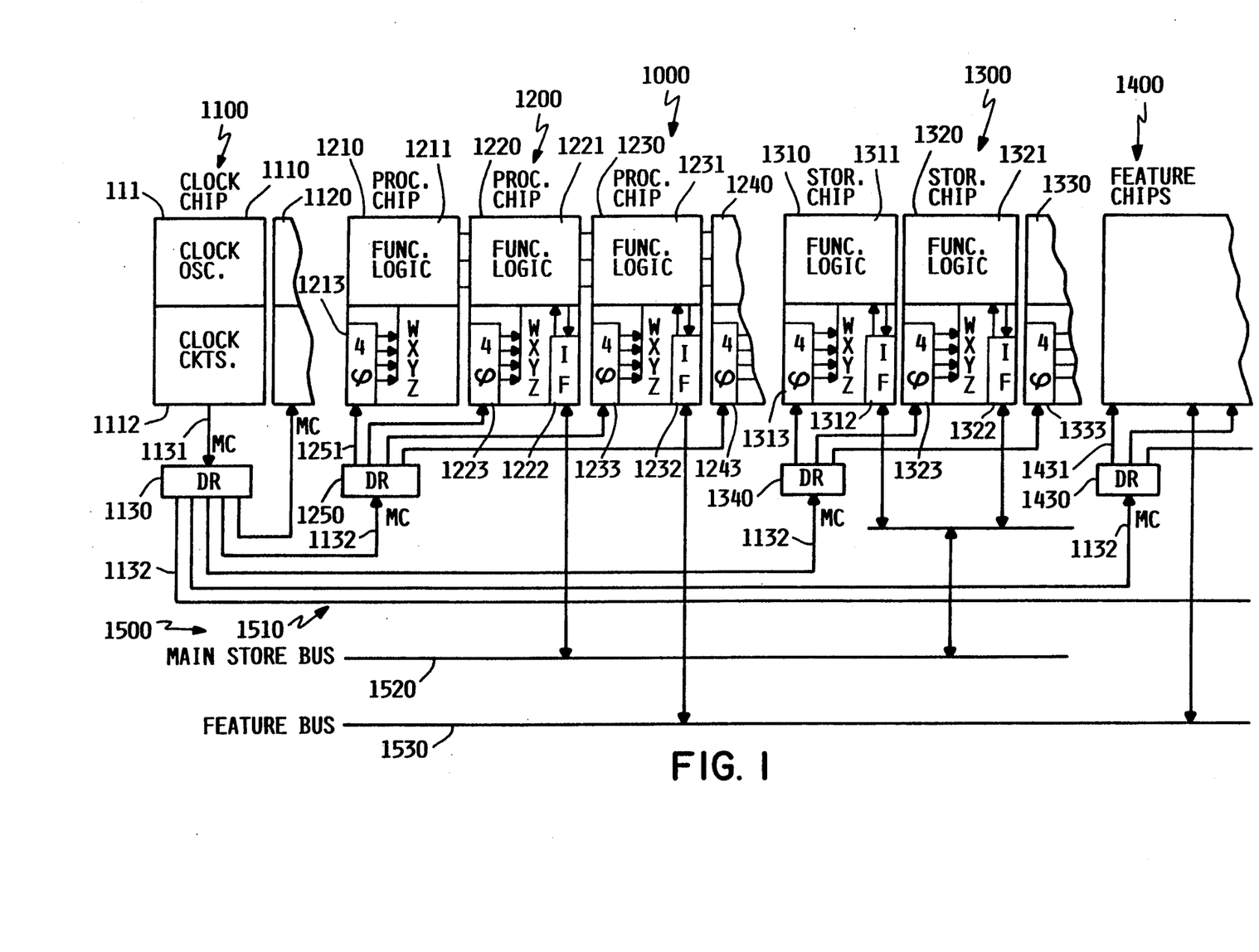
FIG. 1 is a high-level block diagram of a data-processing system incorporating the invention.

FIG. 1 shows relevant portions of a digital data-processing system 1000 constructed as a number of individual circuit cards or boards such as 1100-1400, each containing a functional unit of the system. The cards plug into a number of backplane buses 1500 for transferring signals from one card to another. Each card contains a number of individual chips. The individual chips may be soldered directly to the cards, or they may be bonded to the ceramic substrates of conventional multi-chip modules which are then connected to the cards. These and other packaging methods are compatible with the present invention.

Master card 1100 includes a clock module or chip 1110 and other chips such as 1120 which are not relevant to the invention. A conventional oscillator 1111 produces a clock signal which is modified by other conventional circuits 1112 to produce a single-phase system or master clock signal MC on line 1131. This signal may typically have a frequency $F_{clk}$ in the range of 20 MHz to 100 MHz or so, corresponding to a cycle time of 10 nsec to 50 nsec. A conventional multi-output driver 1130 produces a number of repowered identical copies of the master clock on the individual lines 1132 of a backplane clock bus. The timing of the master clock signal on each line 1132 is the same, and has the waveform labelled MC in FIG. 3. To maintain precision clock timings, MC preferably is a differential signal; that is, each line 1132 is actually implemented as a pair of physical conductors carrying complementary voltages. However, either single-ended or differential signals are useful, and the art would call either form a "single-phase" signal Driver 1130 may be physically packaged as a separate chip, or within a multi-chip module, or as a part of one of the chips 1110-1120.

One of the lines 1132 is returned along a backplane bus 1510 for use in other chips 1120 of card 1100. The others proceed along the backplane bus to the other cards. It is within conventional knowledge to adjust the lengths and characteristics of these lines to minimize differences in the arrival times of the master clock signals at each card position, so that different cards may be plugged into different backplane slots without regard for clock-signal skew.

Processor card 1200 provides the "engine" or "central processing unit" of the overall system. Although this overall function might possibly be implemented entirely within one chip, most systems employ multiple modules or chips such as 1210-1240 to carry out different parts of the functionality. For example, chip 1210 may calculate effective operand addresses; chip 1220 may supervise storage accessing; chip 1230 may control instruction execution; and other chips such as 1240 may perform functions such as floating-point calculations. Each chip includes conventional functional logic, indicated as 1211-1241, for performing these functions. The logics of different chips are also usually interconnected directly with each other, as shown. Some of the chips also include interface circuits for transferring data signals to and from the system buses 1500. For example, circuit 1222 is coupled to each bit of main-store bus 1520 and converts the bidirectional signals of this bus into one set of unidirectional signals from the bus to the functional logic 1221 and into another set of unidirectional signals from the logic to the bus. Interface circuit 1232 performs the same function for coupling multi-bit feature bus 1530 to the functional-logic circuits of chip 1230.

Clock driver 1250 provides a separate master-clock MC signal for each chip. Its function is to provide a clean, repowered version of the single-phase MC waveform on one of the lines 1132 to each individual chip of the processor card, via lines 1251. Again, this driver function may be packaged as a separate chip on the card, on a multi-chip module, or even as a part of one of the chips. As before, the art conventionally adjusts the lengths and other characteristics of lines 1251 so as to minimize differences among the arrival times of the clock-signal copies at each chip 1210-1240.

Figure 3:
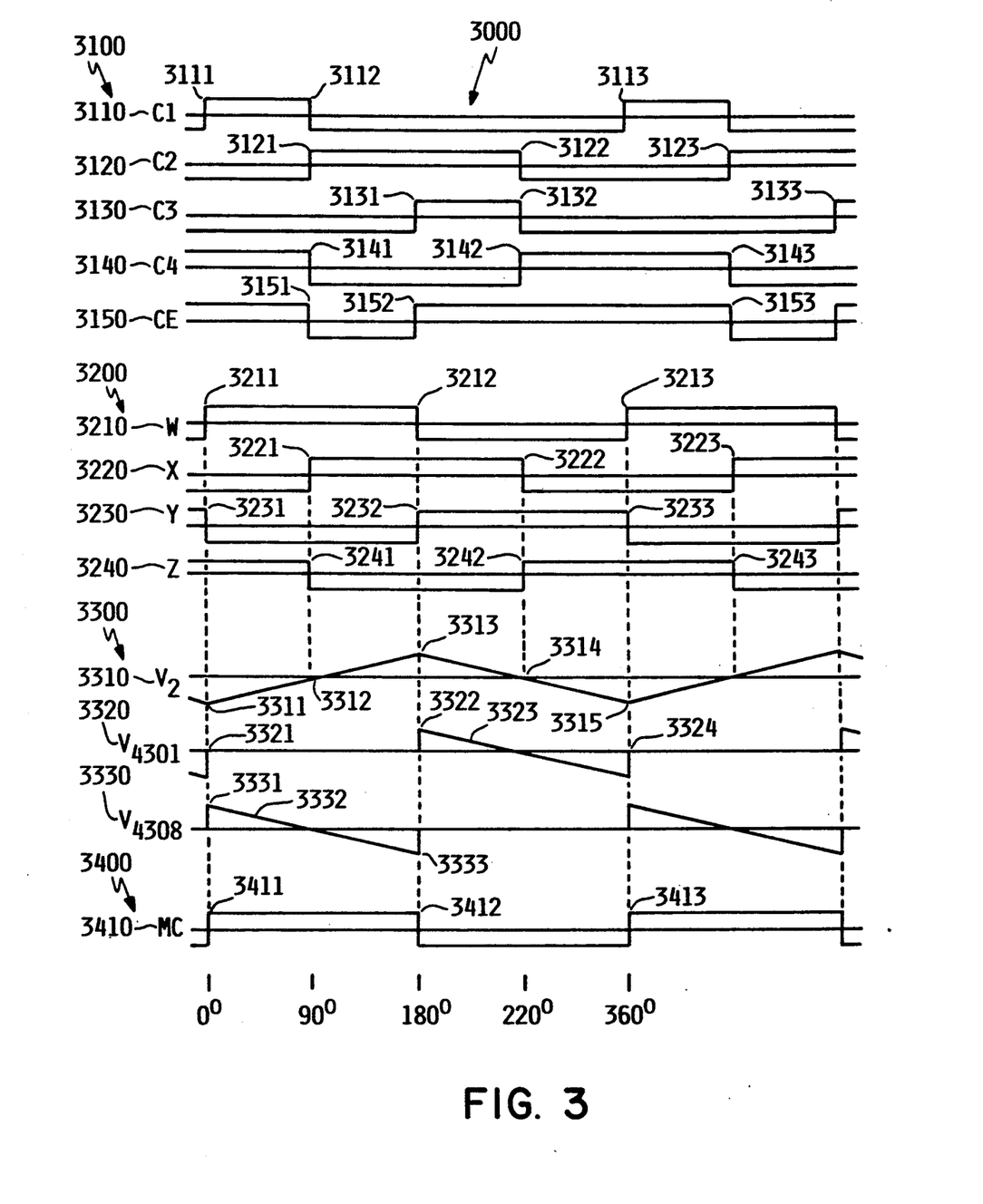
FIG. 3 is a timing diagram of the clock signals received by and generated within the individual chips of FIG. 1.

Separate phase-generator circuits 1213-1243 within each chip 1210-1240 convert the single-phase MC waveform into four-phase clock signals and transmits the clock phases to the respective functional logic circuits within that chip on lines 1214-1244. FIG. 3 shows the timings of the four-phase clock signals as waveforms 3200. The waveform 3210 of phase W rises at the 0° point 3211, falls at the 180° point 3212, then rises again at 3213 to complete its cycle. Waveform 3220 of phase X rises at the 90° point 3221 of the overall cycle, falls at the 270° point 3222, then remains low until 90° into the following cycle, at point 3223. As shown in wave 3230, phase Y is the inverse of phase W, falling at 3231 (0°), rising at 3232 (180°), then remaining high until the end of the cycle at 3233. Likewise, phase Z is the inverse of phase X; wave 3240 falls at 3241 (90°), rises at 3242 (270°), then falls again at 3243, the 90° point of the next cycle.

Main-storage card 1300 operates in a similar manner with respect to the clock signals. Individual storage chips 1310-1330 contain functional logic circuits 1311-1331 for storing and accessing digital data in a conventional manner. Some or all of the chips may also include interface circuits 1312-1322 to main-store bus 1520. Although the logics and interfaces of chips 1310-1330 may use conventional clock signals, the preferred system 1000 implements the same improved clocking technique here as well as on the processor card. Accordingly, driver 1230 provides MC signals to driver 1340, which copies them for the separate phase generators 1313-1333 on each chip, which in turn produce separate four-phase clocks W-Z for the functional logic circuits of each chip.

Feature cards such as 1400 implement input/output adapters and other functions within the overall system 1000. The improved multiphase clocks are preferably —although not necessarily—employed in some or all of these cards in the same manner.

Figure 2A:
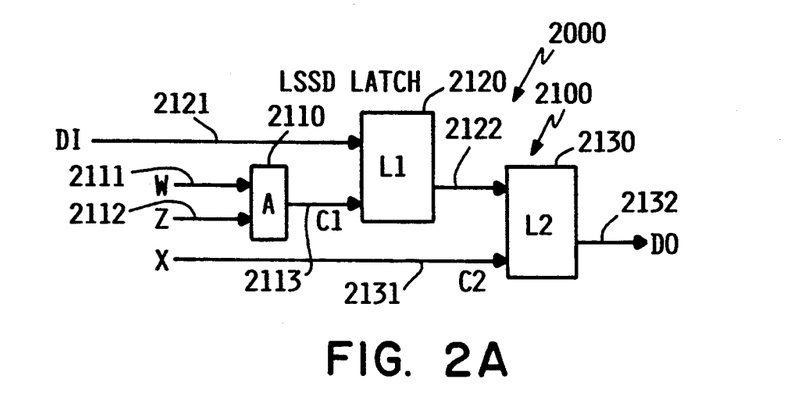
FIGS. 2A, 2B, and 2C, shows more detailed block diagrams of representative logic circuits on the chips of FIG. 1.
Figure 2B:
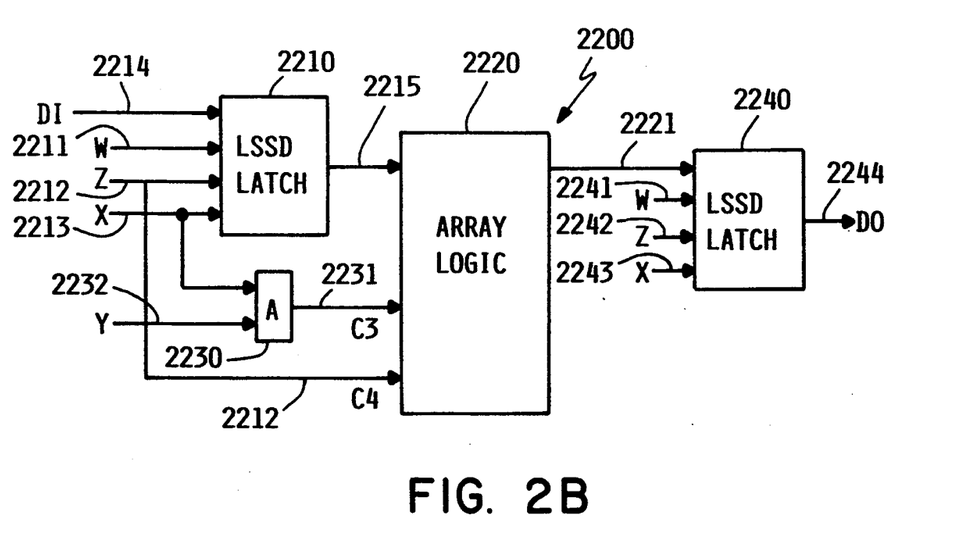
Figure 2C:
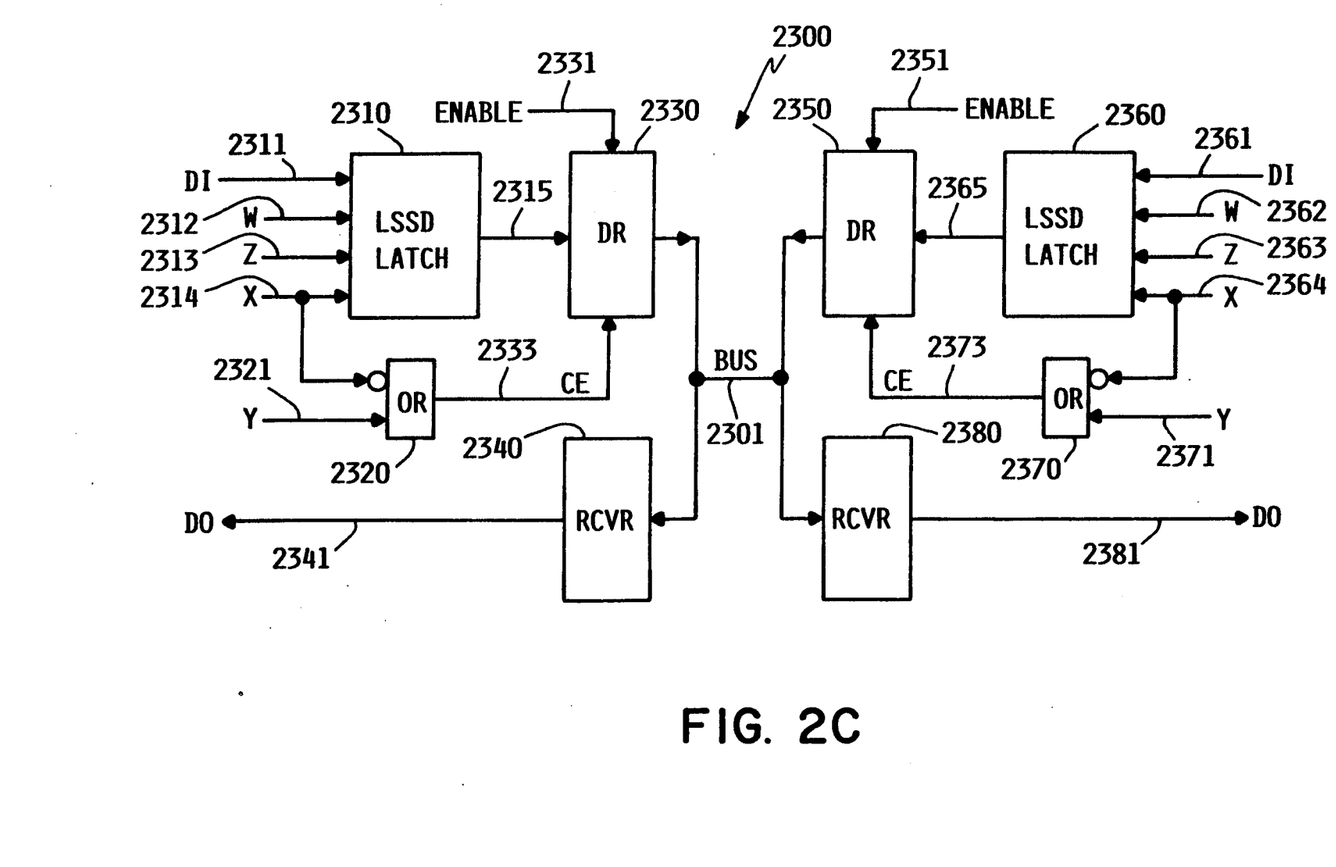

FIG. 2 shows representative functional logic circuits 2000 of the type which are replicated hundreds or thousands of times within any of the functional logics 1111-1331 of FIG. 1, and which are interconnected so as to perform many different functions, such as registers, multiplexers, and arithmetic/logic units. These larger units are then interconnected in conventional ways to achieve the overall functions of each chip in the system. Data signals propagate among the units in accordance with the multiphase clock signals.

Just as the clock lines in FIG. 1 are configured to minimize skew in the arrival times of clock signals at each card and at each chip on a card, the design of the clock-tree circuits within a chip can minimize the skew (arrival-time difference) for any of the clock phases to the functional circuits on that chip, and thereby also ensure the correct relative timing among the various phases at each functional circuit. Copending commonly assigned U.S. patent application Ser. No. 07/502,474, filed Mar. 30, 1990 by C. L. Johnson et al. and hereby incorporated by reference, shows such a design technique.

Circuits 2000 use some of the four-phase clock waveforms 3210-3240 directly. However, they also may require logical combinations of these basic, equally-spaced waveforms. Waveforms 3100 in FIG. 3 show these combination, or derived, clock signals. Derived clock phase Cl, waveform 3110, has a high level for the first 90° of each cycle, from points 3111 to 3112; it then remains low until the beginning of the next cycle at 3113. Derived clock phase C2, having waveform 3120, is the same as phase X, wave 3220. Derived phase C3, wave 3130, lags Cl by 180°—it is high only when both X and Y are high, from points 3131 to 3132. Derived phase C4, wave 3140, is the same as original phase Z, wave 3240, falling at 3241 and rising again at 3242. Phase CE is high either when phase X is low or when phase Y is high. That is, CE is high until point 3151 (90°), falling to its low level until point 3152 (180°). To avoid reduce the number of distributed signals, the derived phases Cl-CE are developed at each circuit location which requires them. In some systems, however, it may be preferable to produce ultimate phase waveforms such as Cl-CE directly at the phase generators 1213-133, FIG. 1, and then to distribute them rather than the original phases W-Z.

Figure 4A:
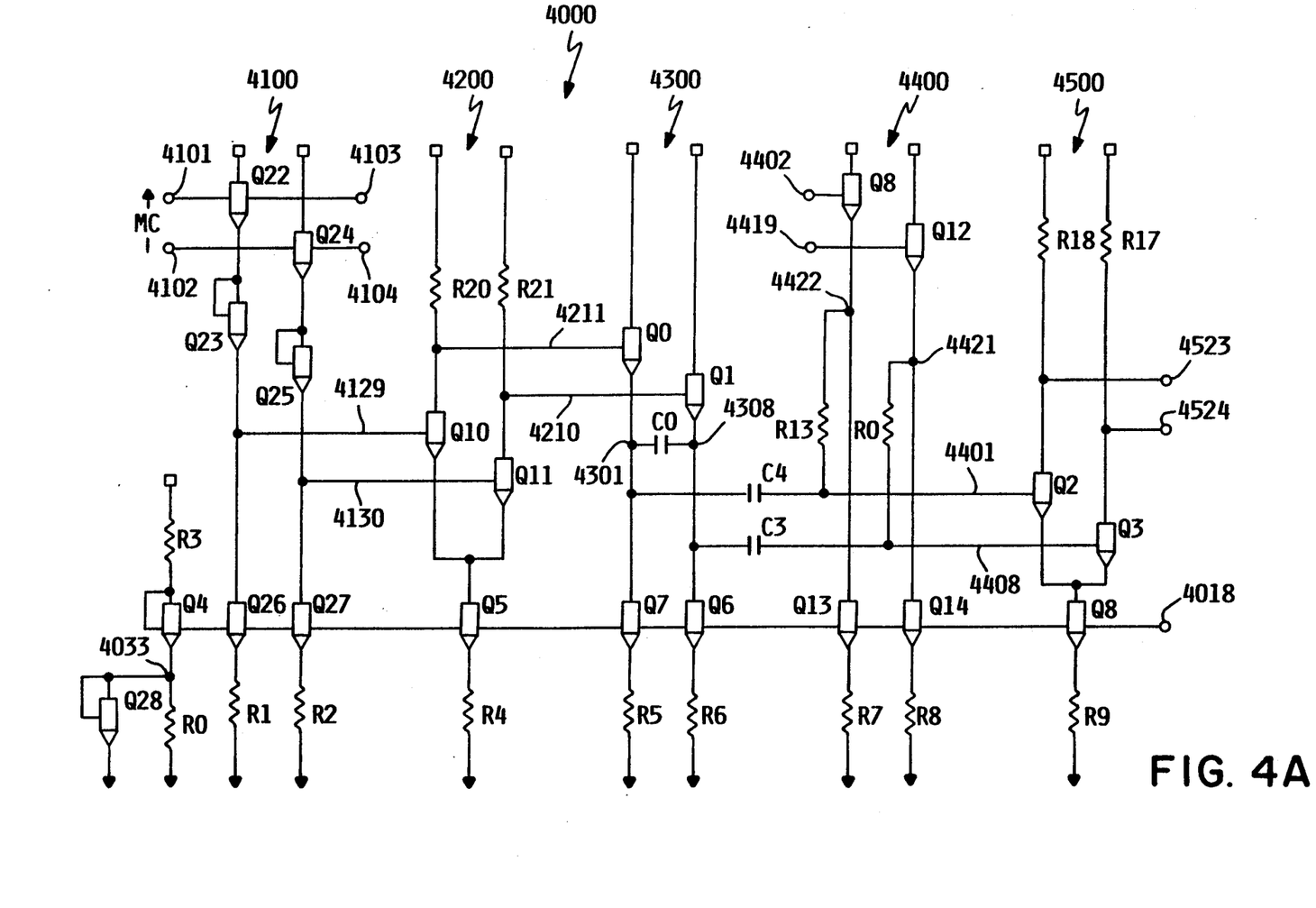
FIGS. 4A and 4B, shows a circuit for producing the four-phase clock signals shown in FIG. 3.
Figure 4B:
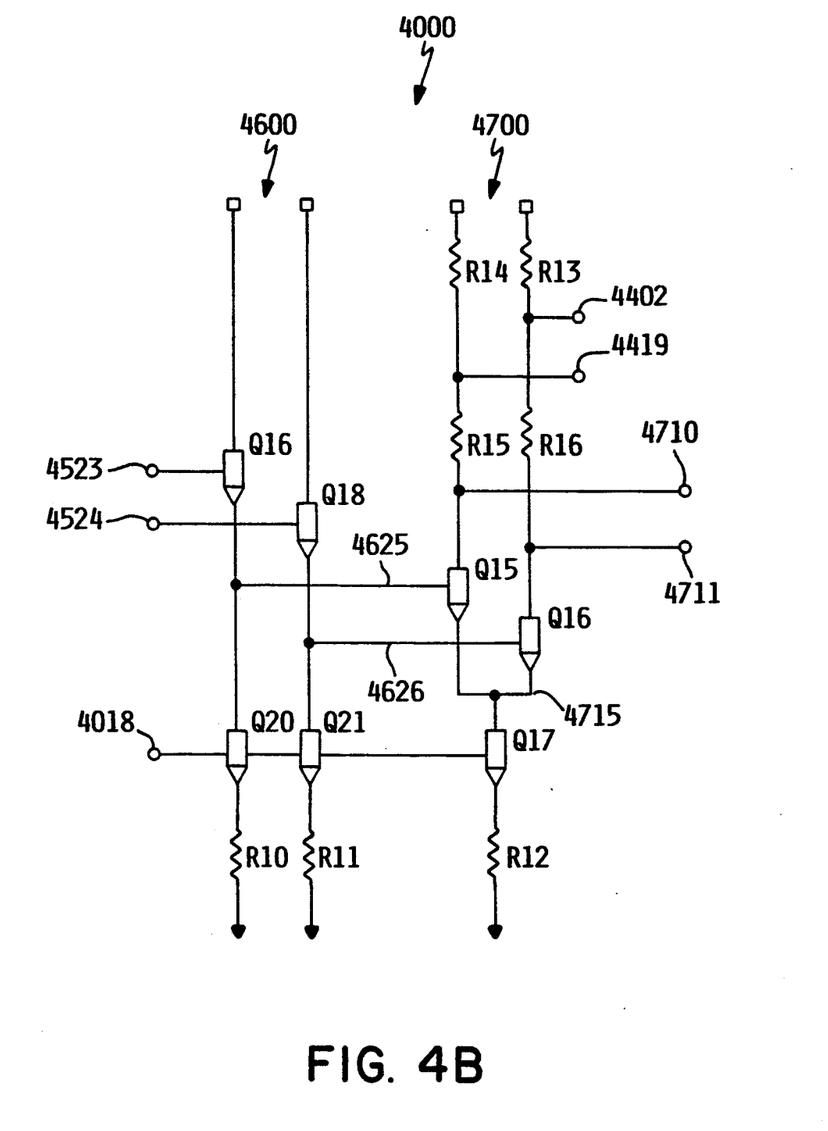

Some families of logic circuits may use the differential clock signals directly. Others use single-ended signals, requiring converter circuits at some point. In one form of the embodiment described more fully in connection with FIG. 5, conventional circuits convert each clock phase separately to single-ended form at the outputs of the phase-generation circuit shown in FIG. 4. The circuits are implemented in a conventional "BiFET" technology, which includes both bipolar and complementary field-effect transistors on the same chip.

FIG. 2A is a block diagram a latch 2100 of the conventional "level-sensitive scan design" (LSSD) type. Latch 2100 transfers an incoming data signal DI to an output DO at a known time with respect to certain clock signals. Before that time, DO retains its previous state in a stable manner. AND gate 2110 converts the distributed clock phases W and Z on lines 2111 and 2112 to the derived clock phase Cl on line 2113. A high value of Cl, occurring between points 3111 and 3112 of FIG. 3, opens L1 latch 2120, so that its output on line 2122 follows the value of the input signal DI on line 2121. When Cl falls at 3112, output 2122 holds its current value. Derived clock C2 (which is the same as the original distributed clock phase X, as described above) then rises at point 3121; line 2131 thus opens L2 latch 2130 to allow output signal DO on line 2132 to assume the value of its data input on line 2122. L1 and L2 latches also answer to the names "D" and "data" latches.

FIG. 2B is a block diagram of a somewhat larger circuit 2200 of the functional logics which may be implemented on the chips of FIG. 1. LSSD latch 2210 is a latch such as 2100, FIG. 2A. AS before, clock phases W, X, and Z on lines 2211-2213 store data DI on line 2214 and transfer it to output line 2215 at the proper time. Array logic 2220 is a conventional array of combinatorial logic without any internal data storage. This logic employs two additional derived clock phases, C3 on line 2231 and C4 on line 2212. Derived phase C3, whose waveform is shown at 3130 in FIG. 3, is produced locally by AND gate 2230 from original phases X and Y on lines 2213 and 2232. Derived phase C4 is the same as original phase Z, as shown at waves 3140 and 3240, FIG. 3. Array-logic output line 2221 becomes the data input for another LSSD latch 2240. Phases W, X, and Z transfer the data on line 2221 to the ultimate output DO on line 2244. Clock-phase lines 2241-2243 may or may not be the same physical lines as 2211-2213, depending upon the relative locations of the latches 2210 and 2240 on the chip.

FIG. 2C illustrates a circuit 2300 for use in interfaces to bidirectional buses, such as blocks 1222, 1232, 1312, and 1322 of FIG. 1. The actual bus line 2301 may transmit a signal from driver 2330 of an interface circuit on one chip to receiver 2380 of an interface circuit on a second chip, when Enable line 2331 is high, or it may transmit a signal from the second-chip driver 2350 to the first-chip receiver 2340, when Enable line 2351 is high. Any overlap in timing may cause both drivers to contend for line 2301 at the same time, causing incorrect signals and possibly damage to the interface circuits. Using four-phase clocks, however, can avoid contention without slowing the entire system by allowing large time margins around each bit time.

LSSD latch 2310 in the first-chip interface circuit receives incoming data DI on line 2311, which is clocked by phase lines 2312-2314 to line 2315. Although an asynchronous Enable line 2331 may already be active, driver 2330 holds line 2301 in a high-impedance state until clocked by derived clock phase CE on line 2333. OR gate 2320 derives CE from original phase Y on line 2321 and the inverse of phase X on line 2314. (Although the inverse of X is logically the same as phase Z, the rise and fall times of the phase signals may differ from each other; the form shown allows a little more settling time.) Wave form 3150, FIG. 3, shows the CE phase signal. Therefore, driver 2330 activates bus line 2301—and passes a signal to data-out (DO) line 2381 of the second-chip receiver 2380, for ¾ of the cycle, while wave 3150 is high.

If the following cycle should find Enable line 2351 raised for a transfer in the other direction, from driver 2350 to receiver 2340, the CE clock phase on line 2373 will not assert a logic level on line 2301 until ¼ cycle (90°) after driver 2320 has released line 2301 to its high-impedance state. This assures that no contention occurs even for some amount of timing skew among different lines carrying the same clock-phase signal.

FIG. 4 is a diagram of a circuit 4000 for producing differential signals representing the clock phases W-Z having the waveforms shown as 3210-3240 in FIG. 3. In this implementation, a "high" signal level on a line is represented by a voltage of 3.6 V on one wire of the line and a voltage of 3.1 V on the other wire, while a "low" signal reverses these potentials. Since the signals are differential, the inverse of any signal is obtained simply by interchanging the two wires of its line. Therefore, generating four equally-spaced clock phases in this system requires only the generation of a 90°-degree phase shift from an incoming master clock. As shown in FIG. 3, phase W (wave 3210) is the same as the single-phase master clock signal MC (wave 3410). Phase Y (wave 3230) is the inverse of phase W, obtained by interchanging the two wires of its signal line. Circuit 4000 generates phase X (wave 3220) by delaying phase W by 1/4 cycle (90°). Phase Z (wave 3240) is the inverse of phase X, obtained by interchanging the two wires of its signal line. That is, the major function of circuit 4000 is to produce an accurate, stable 90°-phase shift of an input differential signal and to output it in a compatible form.

In the diagram of FIG. 4, a small square represents a connection to a positive supply voltage, 3.6 V for the technology employed here. A downward-pointing triangle represents a connection to a ground potential. A circle is a signal contact. A vertical arrow represents the sense of a signal voltage between two contacts.

An initial stage 4100 receives the master clock signal MC between contacts 4101 and 4102. This signal, which swings between 3.1V and 3.6V, is passed directly to contacts 4103 and 4104 as clock phases W ($V_{4103}-V_{4104}$) and Y ($V_{4104}-V_{4103}$). Stage 4100 forms a conventional DC level-shift circuit to lower the signal voltages to swing between 2.0 V and 1.5 V at nodes 4129 and 4130.

Stage 4200 is a differential amplifier which provides enough gain to increase the 0.5 V voltage difference at its inputs 4129-4130 to a 1.0 V difference at its outputs 4210-4211.

Stage 4300 converts the square-wave differential voltage at 4210-4211 to a differential triangular waveform across an on-chip capacitor CO, at nodes 4301 and 4308. FIG. 3 shows the differential triangular wave 3310, as well as the individual waves 3320 and 3330 at each side of the capacitor.

When node 4102 rises (and 4101 simultaneously falls), node 4130 rises and node 4129 falls. This causes node 4210 to fall and 4211 to rise. The rising voltage at node 4211 forces node 4301 to rise, as shown at time 3321 in FIG. 3. Because the voltage across a capacitor cannot change instantaneously, node 4308 also rises abruptly, as shown at 3331. Between time points 3331 and 3333, Q0 is turned on, holding 4301 at a constant voltage. Q1 is turned off, isolating node 4308 from the supply voltage. Q6 pulls a constant current through CO. This discharges capacitor CO linearly, so that the voltage at 4308 decreases linearly between points 3331 and 3333.

At time 3333, an input transition at 3412 causes the voltage at node 4101 to rise, and node 4102 to fall. This causes node 4130 to fall and 4210 to rise. As Q1 turns on, node 4308 rises at 3333. Capacitor CO forces 4301 to follow 4308 upward, turning off Q0. From time 3322 to time 3324, node 4301 ramps down linearly as the constant current through Q7 discharges CO. The capacitance of CO and the values of current-sink resistors R5 and R6 are chosen such that $V_{4308}$ does not fall low enough to turn on Q1 before the next transition 3413 of MC arrives. Transition 3413 then initiates another cycle identical to the one just described.

Stage 4400 provides symmetry and level compensation. Any asymmetry in the input waveform MC shifts the voltage levels of the ramps at nodes 4301 and 4308 undesirably. Capacitors C3 and C4 provide AC coupling of the voltage difference across capacitor CO; this recenters the signal voltage to eliminate asymmetry. Resistors R0 and R13 restore equal DC bias to the signal under the control of transistors Q8 and Q12. Waveform 3310 shows the resulting voltage difference between these two nodes, $V_d = V_{4301} - V_{4308}$. This triangular waveform has an upward inflection at time 3311 (0° in the cycle), then proceeds linearly through a midpoint voltage level at 3312 (precisely 90° in the cycle) to a peak at time 3313 (180°). Proceeding linearly downward, $V_d$ intersects the midpoint level precisely at time 3314 (270°) and continues to the end of the cycle at time 3315 (360°), where it commences the next cycle. At this point in the circuit 4000, the 0° and 180° points of the clock cycle are defined by transitions 3411 and 3412 in the MC wave 3410, while the 90° and 270° points are defined by midpoint crossings 3312 and 3314 in the triangular wave 3310 at nodes 4401 and 4408.

Stage 4500 implements a detector or comparator function to switch node 4524 to a high level precisely as the triangular wave 3310 crosses midpoint 3312, and to drive it low again at time 3314. Stage 4500 switches node 4523 in a complementary manner: on precisely at midpoint time 3314 and off at 3312.

Stages 4600 and 4700 square up the transitions at nodes 4523-4524, to present a clean, digital square wave at output contacts 4710-4711. This waveform is clock phase Z (waveform 3240) when taken as $V_Z = V_{4710} - V_{4711}$; when taken in the opposite sense as $V_X = V_{4711} - V_{4710}$, it is clock phase X (waveform 3220).

Connections 4402 and 4419 tap off a portion of the output of stage 4700 to vary the bias voltages applied to nodes 4401 and 4408. This provides an amount of hysteresis to prevent switching in stage 4500 due to noise, particularly for low frequencies of the input signal MC.

Figure 5:
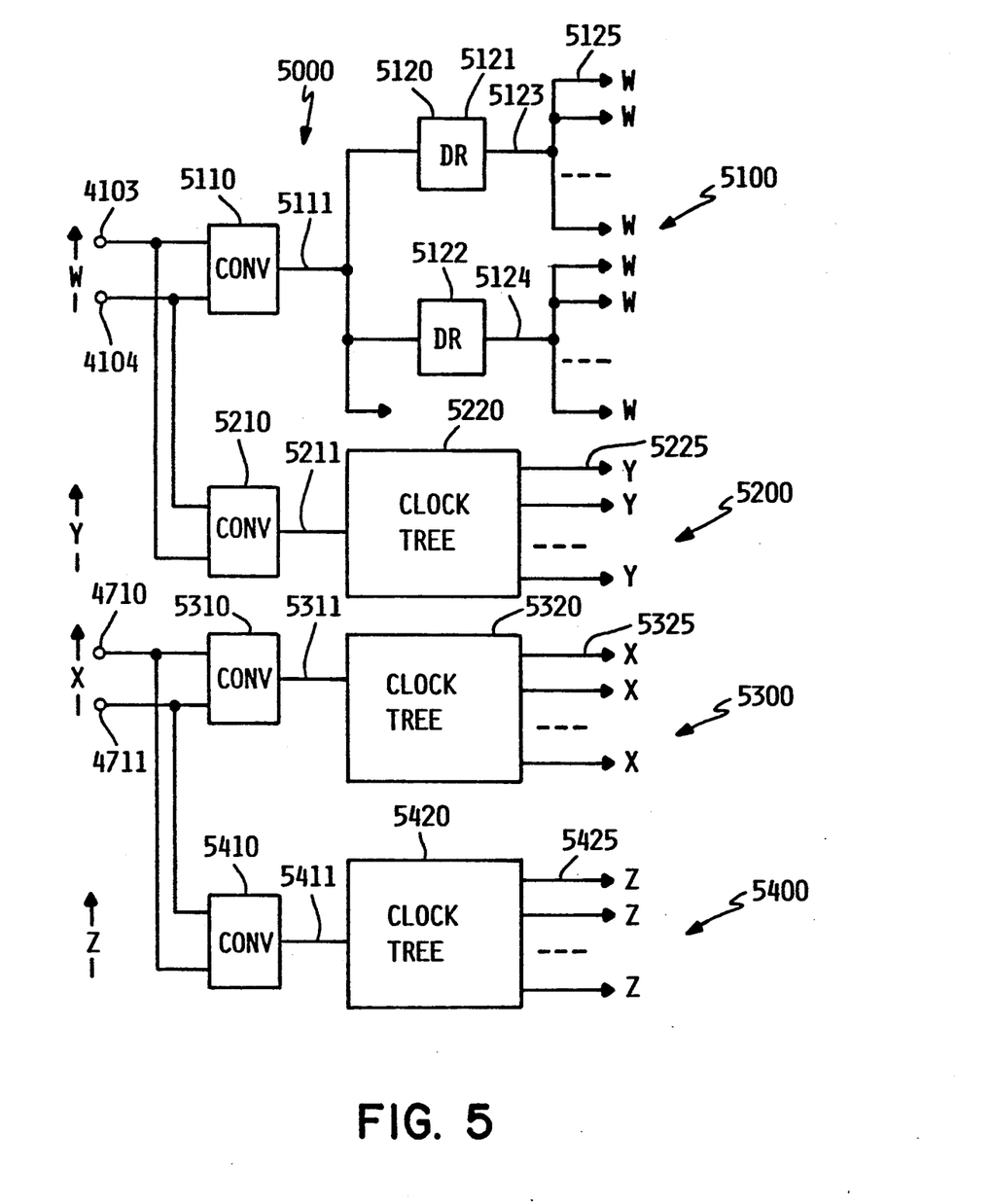
FIG. 5 is a block diagram for distributing the four-phase clock signals from FIG. 4.

FIG. 5 is a block diagram of a distribution network 5000 for transporting the four-phase clock signals from circuit 4000, FIG. 4, to logic circuits such as 2000, FIG. 2, on the same chip.

A first section 5100 of the network distributes clock phase W. Because the functional logic of this implementation employs single-ended signals, a conventional converter 5110 transforms the differential W-phase signal on wires 4103 and 4104 to a ground-referenced signal on line 5111. This line fans out in a clock tree 5120 to a number of drivers 5121, 5122, etc. Their outputs in turn fan out, either to a further level of drivers (not shown) or to ultimate outputs 5125 which feed the W clock signal directly to functional-logic input such as those at 2111 or 2312 of FIG. 2.

Section 5200 distributes clock phase Y. Converter 5210 receives wires 4103 and 4104 in reverse order from that of converter 5110. Therefore, the single-ended signal on line 5211 is clock phase Y, which is the logical inverse of phase W. Clock tree 5220 repowers this signal through a number of levels to produce ultimate outputs 5225. These outputs are coupled to functional-logic clock inputs such as 2232 and 2321, FIG. 2.

Section 5300 receives clock phase X on lines 4710 and 4711. Converter 5310 provides a single-ended output on line 5311 for distribution by clock tree 5320 to outputs 5325. These outputs drive X-phase inputs such as 2131 and 2213 in FIG. 2. Section 5400 receives an inverse of differential phase X at converter 5410, so the single-ended waveform on line 5411 is clock phase Z, the logical inverse of X. These output feed inputs 2112, 2331, etc. in FIG. 2. as described more fully in the cited application Ser. No. 07/502,474, each section 5100-5400 of distribution network 5000 can be constructed to minimize the time differences among the individual lines of the ultimate outputs for each phase, such as 5125 for phase W. Moreover, each section can be constructed to have the same overall time delay as the other sections, so that the time differences between the phases W-Z are preserved very closely at the ultimate outputs 5125-5425.

A number of possible modifications to the above preferred embodiment have been mentioned above. Others within the spirit and scope of the present invention will suggest themselves to those having routine skill in the applicable arts.

We claim as our invention:

1. A digital system, comprising: a clock module for producing a single-phase, square-wave master clock signal at a frequency $F_{clk}$;
   a clock bus carrying said master clock signal;
   a plurality of separate semiconductor chips, each said separate chip including
   a plurality of mutually interconnected digital logic circuits for executing a predetermined function in response to a plurality of clock phase inputs,
   a clock phase generator circuit having means coupled to said clock bus for converting said single-phase, square-wave master clock into a further wave at said frequency $F_{clk}$;
   means for detecting a predetermined feature of said further wave,
   means for producing a second square-wave clock signal at said frequency $F_{clk}$, said second clock signal having transitions at times corresponding to said predetermined feature,
   a plurality of clock trees responsive to said master clock signal and said second clock signal for distributing a plurality of different clock phase signals to said clock phase inputs of said logic circuits on said chip;
   means for interconnecting said logic circuits among different ones of said chips so as to perform an overall system function.

2. The system of claim 1, wherein said system further comprises:
   a plurality of individual cards each holding a subset of said separate semiconductor chips;
   a plurality of buses for interconnecting different ones of said subsets of said chips to each other.

3. The system of claim 2, wherein said clock module is physically located on one of said cards.

4. The system of claim 1, wherein said clock trees distribute four different clock phase signals.

5. The system of claim 4, wherein said four clock phase signals comprise:
   a first phase signal corresponding to said master clock signal,
   a second phase signal corresponding to said second square-wave signal,
   a third phase signal corresponding to a logical inverse of said master clock signal,
   a fourth phase signal corresponding to a logical inverse of said second square-wave signal.

6. The system of claim 5, further comprising:
   means for logically combining at least one of said phase signals into a derived clock phase signal, and for coupling said derived clock phase signal to said clock phase inputs of said digital logic circuits.

7. The system of claim 1, wherein said further wave is a triangular wave, and wherein said predetermined feature is a level of said further wave.

8. The system of claim 7, wherein said level is a midpoint between a highest and a lowest level of said triangular wave.

9. A card for performing a predetermined card function within a digital system having a clock module for producing a single-phase, square-wave master clock signal at a frequency $F_{clk}$ and a clock bus carrying said master clock signal to said card, said function card comprising:
   means for receiving said single-phase master clock signal;
   a plurality of separate semiconductor chips, each said separate chip including
   a plurality of mutually interconnected digital logic circuits for executing a predetermined function in response to a plurality of clock phase inputs,
   a clock phase generator circuit having
   means coupled to said clock bus for converting said single-phase, square-wave master clock into a further wave at said frequency $F_{clk}$;
   means for detecting a predetermined feature of said further wave,
   means for producing a second square-wave clock signal at said frequency $F_{clk}$, said second clock signal having transitions at times corresponding to said predetermined feature,
   a plurality of clock trees responsive to said master clock signal and said second clock signal for distributing a plurality of different clock phase signals to said clock phase inputs of said logic circuits on said chip;
   means for interconnecting said logic circuits among different ones of said chips so as to perform said card function.

10. The card of claim 9, wherein said clock trees distribute four different clock phase signals.

11. The card of claim 10, wherein said four clock phase signals comprise:
    a first phase signal corresponding to said master clock signal,
    a second phase signal corresponding to said second square-wave signal,
    a third phase signal corresponding to a logical inverse of said master clock signal,
    a fourth phase signal corresponding to a logical inverse of said second square-wave signal.

12. The card of claim 11, further comprising:
    means for logically combining at least one of said phase signals into a derived clock phase signal, and for coupling said derived clock phase signal to said clock phase inputs of said digital logic circuits.

13. The card of claim 9, wherein said further wave is a triangular wave, and wherein said predetermined feature is a level of said further wave.

14. The card of claim 13, wherein said level is a midpoint between a highest and a lowest level of said triangular wave.

15. The card of claim g, wherein said means for receiving said master clock signal is a driver for producing multiple copies of said master clock signal, and for transmitting respective ones of said copies to different ones of said chips.

16. An individual semiconductor chip for performing a predetermined chip function in a digital system,
    a plurality of mutually interconnected digital logic circuits for executing said function in response to a plurality of clock phase inputs,
    a clock phase generator circuit having
    means for receiving a single-phase square wave master clock signal,
    means for converting said single-phase, square-wave master clock into a further wave at said frequency $F_{clk}$;
    means for detecting a predetermined feature of said further wave, means for producing a second square-wave clock signal at said frequency $F_{clk}$, said second clock signal having transitions at times corresponding to said predetermined feature, a plurality of clock trees responsive to said master clock signal and said second clock signal for distributing a plurality of different clock phase signals to said clock phase inputs of said logic circuits on said chip.

17. The chip of claim 16, wherein said clock trees distribute four different clock phase signals.

18. The chip of claim 17, wherein said four clock phase signals comprise:

a first phase signal corresponding to said master clock signal, a second phase signal corresponding to said second square-wave signal, a third phase signal corresponding to a logical inverse of said master clock signal, a fourth phase signal corresponding to a logical inverse of said second square-wave signal.

19. The chip of claim 16, further comprising:

means for logically combining at least one of said phase signals into a derived clock phase signal, and for coupling said derived clock phase signal to said clock phase inputs of said digital logic circuits.

20. The chip of claim 16, wherein said further wave is a triangular wave, and wherein said predetermined feature is a level of said further wave.

21. The chip of claim 20, wherein said level is a midpoint between a highest and a lowest level of said triangular wave.

22. The chip of claim 16, further comprising:

at least one interface circuit coupled to said digital logic circuits for transmitting data signals off said chip and receiving data signals onto said chip in response to said clock phase signals.

23. The chip of claim 22, wherein said interface circuit is coupled to said digital logic circuits by unidirectional data signal lines, and transfers data onto and from said chip on bidirectional signal lines.

24. A clock phase generator circuit for a digital semiconductor chip, said circuit comprising:

(A) means for receiving a single-phase square wave master clock signal;

(B) means for converting said single-phase, square-wave master clock into a triangular wave at said frequency $F_{clk}$;

(C) means for detecting a predetermined level of said triangular wave;

(D) means for producing a second square-wave clock signal at said frequency $F_{clk}$, said second clock signal having transitions at times corresponding to said predetermined level.

25. The circuit of claim 24, wherein said converting means includes means for charging a capacitor during a first interval of said square wave master clock signal;

means for discharging said capacitor during a second interval of said master clock signal.

26. The circuit of claim 25, wherein said charging means charges said capacitor at a constant current, and wherein said discharging means discharges said capacitor at a constant rate.

27. The circuit of claim 24, wherein said detecting means includes compensation means for reducing asymmetry in said triangular wave, comparator means for detecting a midpoint level of said triangular wave as said predetermined level.

28. The circuit of claim 27, wherein said compensation means includes

AC coupling means,

DC bias restoration means.

29. Claim 24, wherein said producing means includes hysteresis means coupled to said detecting means.

* * * * *